(12) United States Patent
Schepis

(10) Patent No.: US 6,872,301 B2
(45) Date of Patent: Mar. 29, 2005

(54) HIGH SHEAR ROTATING DISC FILTER

(76) Inventor: Anthony Schepis, 124 Olde Forge Rd., Hanover, MA (US) 02339

(\*) Notice: Subject to any disclaimer, the term of this patent is extended or adjusted under 35 U.S.C. 154(b) by 0 days.

(21) Appl. No.: 10/027,175

(22) Filed: Dec. 20, 2001

(65) Prior Publication Data

US 2003/0116496 A1 Jun. 26, 2003

(51) Int. Cl.[7] ............................................. B01D 33/23
(52) U.S. Cl. .................... 210/195.3; 210/331; 210/345; 210/347; 210/398; 210/406; 210/456; 210/486; 210/510.1
(58) Field of Search ................................ 210/172, 194, 210/195.3, 321.68, 324, 330, 331, 332, 346, 347, 398, 402, 486, 456, 487, 510.1, 345, 406

(56) References Cited

U.S. PATENT DOCUMENTS

| | | | | |
|---|---|---|---|---|
| 920,739 | A | * | 5/1909 | Hedges et al. ............... 210/331 |
| 1,264,635 | A | * | 4/1918 | Graham ....................... 210/331 |
| 3,245,536 | A | * | 4/1966 | McKay ........................ 210/784 |
| 3,262,577 | A | * | 7/1966 | Tuit ............................. 210/487 |
| 3,319,793 | A | * | 5/1967 | Miller, Jr. et al. ........... 210/243 |
| 4,186,089 | A | * | 1/1980 | Okada ......................... 210/738 |
| 4,728,424 | A | * | 3/1988 | Miura ......................... 210/331 |
| 4,925,557 | A | * | 5/1990 | Ahlberg et al. ......... 210/321.68 |
| 5,110,463 | A | * | 5/1992 | Yuichi et al. ............... 210/194 |
| 5,593,583 | A | * | 1/1997 | Geldmacher ................ 210/331 |
| 6,258,282 | B1 | | 7/2001 | Strid et al. |
| 6,416,666 | B1 | * | 7/2002 | Salyer et al. ........... 210/321.75 |
| 2001/0001457 | A1 | | 5/2001 | Huebner |
| 2001/0012814 | A1 | | 8/2001 | May et al. |

FOREIGN PATENT DOCUMENTS

| | | | | |
|---|---|---|---|---|
| JP | 181503 | * | 8/1986 | ............ 210/321.68 |
| SU | 591203 | * | 2/1978 | ............ 210/321.68 |

OTHER PUBLICATIONS

New Logic International, www.vsep.com/techpage3.htm (4 pages) "Vibratory Shear Enhanced Process Tech.".

\* cited by examiner

*Primary Examiner*—Matthew O. Savage
(74) *Attorney, Agent, or Firm*—John P. McGonagle

(57) ABSTRACT

A high shear rotating disc filter having a hollow interior and constructed of a porous material such as sintered metal or ceramic with finely structured openings. The disc is mounted and secured onto a hollow shaft. The hollow shaft is connected to a vacuum source, external to the filter, that allows for the passage of the filtrate to a receiver. There are elongated slots in the wall of the shaft which provide the passage of filtrate from the disc. The shaft provides rotational force for the discs.

8 Claims, 5 Drawing Sheets

HIGH SHEAR ROTATING DISC FILTER

BACKGROUND OF THE INVENTION

This invention relates to filters, and in particular to a high shear rotating disc filter.

Current filtering technologies cover a wide gamut of designs for a wide variety of liquid/solid separating applications. Solids refer to small particles as in powders. These technologies are necessitated by the many filtering characteristics of the liquid/solid mixtures or slurries which are being separated. a slurry being defined as a liquid solid mixture. Such characteristics will include particle size distribution, particle shapes, particle hardness/softness, solids concentration, liquid viscosity, flow rate slurry temperature, degree of separation required, etc. However, each filtering technology has its operation and economic limitations. Commonly used filters include: filter press with and without membrane bladders, candle filters, leaf filters (vertical and horizontal), nutsche type filters, rotary vacuum filters, vacuum disc filters, etc.

With each of the commonly used filters, the general mode of operation might include some of the following steps:
  (i) pre-coating the filter leaves with filter-aid such as diatomaceous earth (DE);
  (ii) introducing the slurry to be filtered (may also contain filter-aid in the form of a body feed);
  (iii) separating the liquid and solid phases via vacuum or pressure, continuing until resistance to filtrate (clean filtered liquid) flow increases to a specified pressure level (a sign that the open areas between the solid particles have been greatly reduced and thereby choking the flow of the filtrate; blinding, i.e., filtrate surface being made impervious, is effectively occurring and thereby advancing the cycle to its next step such as washing, squeezing, discharging, back-washing, etc.);
  (iv) discharging the remaining slurry within the filter chamber (typically recycled back to the feed tank as unfiltered slurry);
  (v) passing a high volume of air through the filtered cake to dry the filtered solids (some filters will employ added mechanical pressure to squeeze the solids to a drier consistency);
  (vi) discharging the accumulated solids; and
  (vii) reclaiming semi-dry and wet solids at the bottom of the filtration vessel and disposing the solids along with any filter aid used.

With some filtering technologies, such as a rotary vacuum drum filter and a vacuum disc filter, the liquid-solid separation is accomplished by dipping a part of the drum or disc into the slurry while applying a vacuum to draw the liquid through the thin layer of cake, past the filter medium and out of the vessel via a series of internal pipes. As the drum/disc rotates, the formed cake on the surface of the medium will move out of the wet slurry and is then exposed to the air for more drying by added suction (vacuum) until it reaches a point at which the cake is discharged from the surface by a variety of means such as discharge blades or pneumatic blow-back. As the drum/disc continues to rotate it will then again dip into the slurry and the cycle starts all over again.

One other commonly used technology for the separation of these slurries is that of centrifuging, i.e., decanters and disc-stack centrifuges. The high rotational speeds of these units will generate forces up to 15,000×G's. The centrifugal forces will effectively separate the liquid/solid slurries due to the specific gravity differences between the solids and liquids.

Each technology has its limitations based on a variety of factors that include: specific gravity differences, concentrations, viscosities, solids characteristics, etc.

The present invention is primarily applied to slurries that contain low solids concentrations and small particle size distributions, though not limited solely to these applications. The characteristics of the solids will generally be somewhat soft and have a particle size of less than 20 microns to possible sub-micron. Historically, these slurries have been filtered with the assistance of filter-aid such as DE (diatomaceous earth) since the solids being filtered have a tendency to blind the filter medium soon after the initial solids layer is deposited on its surface. The intent of the filter-aid is to assist in preventing "blinding" of the filter medium by providing more surface area on which the solids can rest while maintaining a more open flow for the filtrate. However, if the DE is used as a pre-coat or body feed, it will eventually have to be discarded with the accumulated solids which will add to the cost of the operation. In cases where the solids are a valuable product, DE cannot be used since it will contaminate the solids.

SUMMARY OF THE INVENTION

The present invention's mode of operation is dissimilar to the commonly known filtering technologies in that it does not target the isolation of the solids to a "dry" state once separated from the original liquid slurry. "Dry" is a relative term noting that these solids still have substantial levels of moisture. Rather, the present invention is specifically designed to concentrate solids into a very thick stream while providing a clean filtrate as established by the structured openings of a sintered medium and the required process parameters.

By concentrating the solids content of a given slurry on a continuous basis, the present invention is able to greatly reduce the liquid loading that needs to be processed. This reduces the handling cost of the slurry and improves separation efficiency. Due to the present invention's shearing effect, the concentration is done without the assistance of a filter-aid thereby eliminating that part of the cost burden as well as the handling and disposal of the contaminated solids.

The present invention high shear rotating disc filter is constructed of a porous material such as sintered metal or ceramic with finely structured openings. The disc has a hollow interior and is mounted and secured onto a shaft which is also hollow. The hollow shaft is connected to a vacuum source, external to the filter, that allows for the passage of the filtrate to the receiver. There are elongated slots in the wall of the shaft which provide the passage of filtrate from the disc elements. Effectively, there is a continuous void from the interior of the disc, through the hollow shaft and out of the vessel to a vacuum receiver where the filtrate is eventually collected. The shaft is rotated and provides rotational force for the discs.

The high shear can also be achieved even if it were a cylindrical tube. However, using a disc increases the surface area of the filtering medium, thereby resulting in the filter's higher filtrate capacity.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
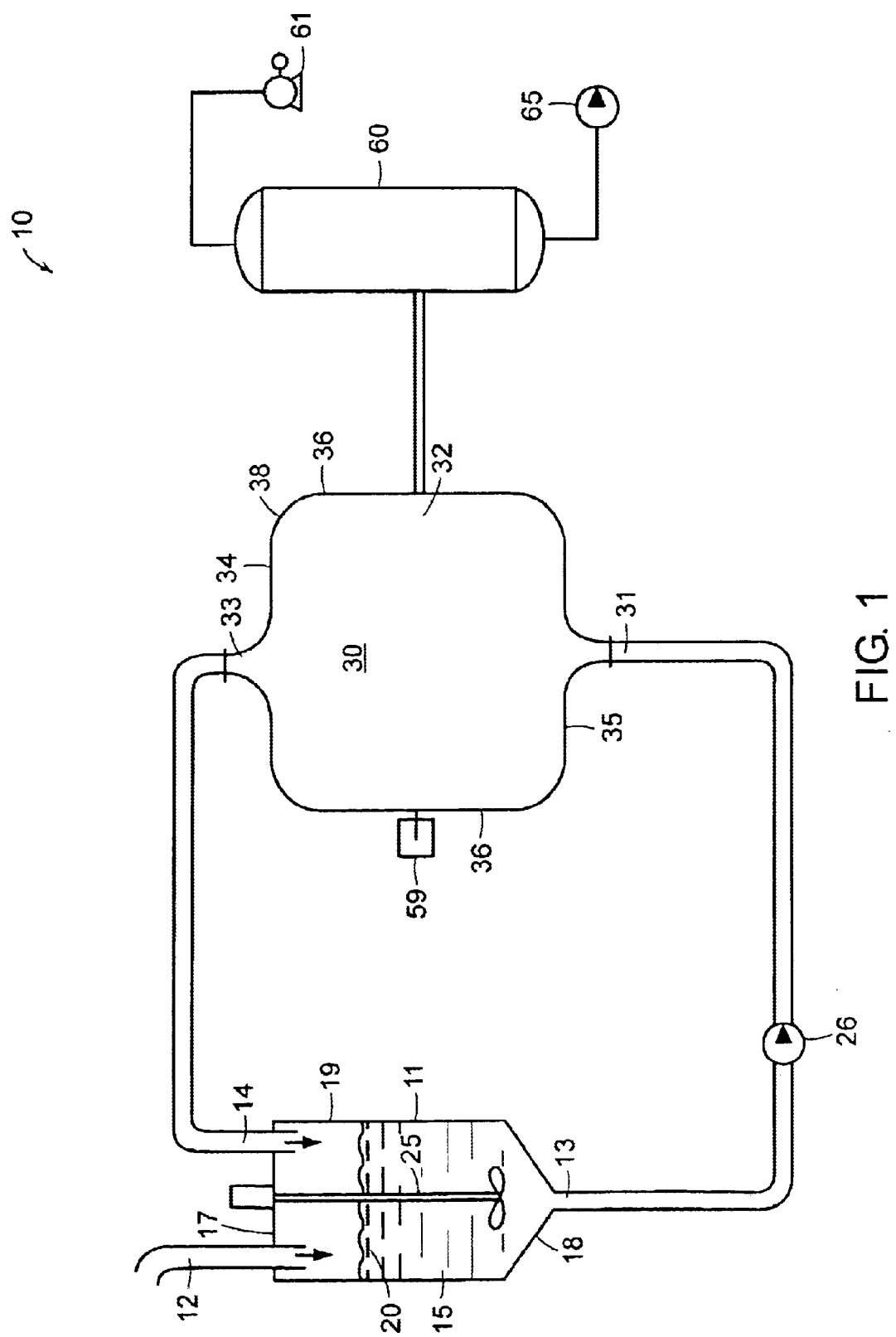
FIG. 1 is a schematic diagram of a high shear rotating disc filter system.

Referring to the drawings in detail wherein like elements are indicated by like numerals, there is shown in FIG. 1 a basic filtering system 10 using a high shear rotating disc filter assembly 30. The system 10 has a feed tank 11 with a top 17 (either open or closed), bottom 18 and side wall 19 extending upward from the bottom 18 and terminating at the top 17, said top 17, bottom 18 and side wall 19 defining a feed tank interior 15. The feed tank 11 has an input means 12 at the tank top 17, an output means 13 at the tank bottom 18, and recycle input means 14 at the tank top 17. The feed tank 11 also has a mixing means 25 extending into the tank interior 15. The feed tank 11 acts as a holding tank for the "slurry to be filtered" 20. The slurry 20 contains liquid and very small particles 23. The mixer 25 provides homogeneity to the feed slurry 20. The slurry 20 to be filtered is drawn out of the feed tank 11 through the tank output means 13 at the tank bottom 18 by a feed pump 26. The slurry 20 to be filtered is pumped into a high shear rotating disc filter assembly inlet 31. The feed pump 26 continuously feeds slurry 20 to the high shear rotating disc filter assembly inlet 31.

Figure 2:
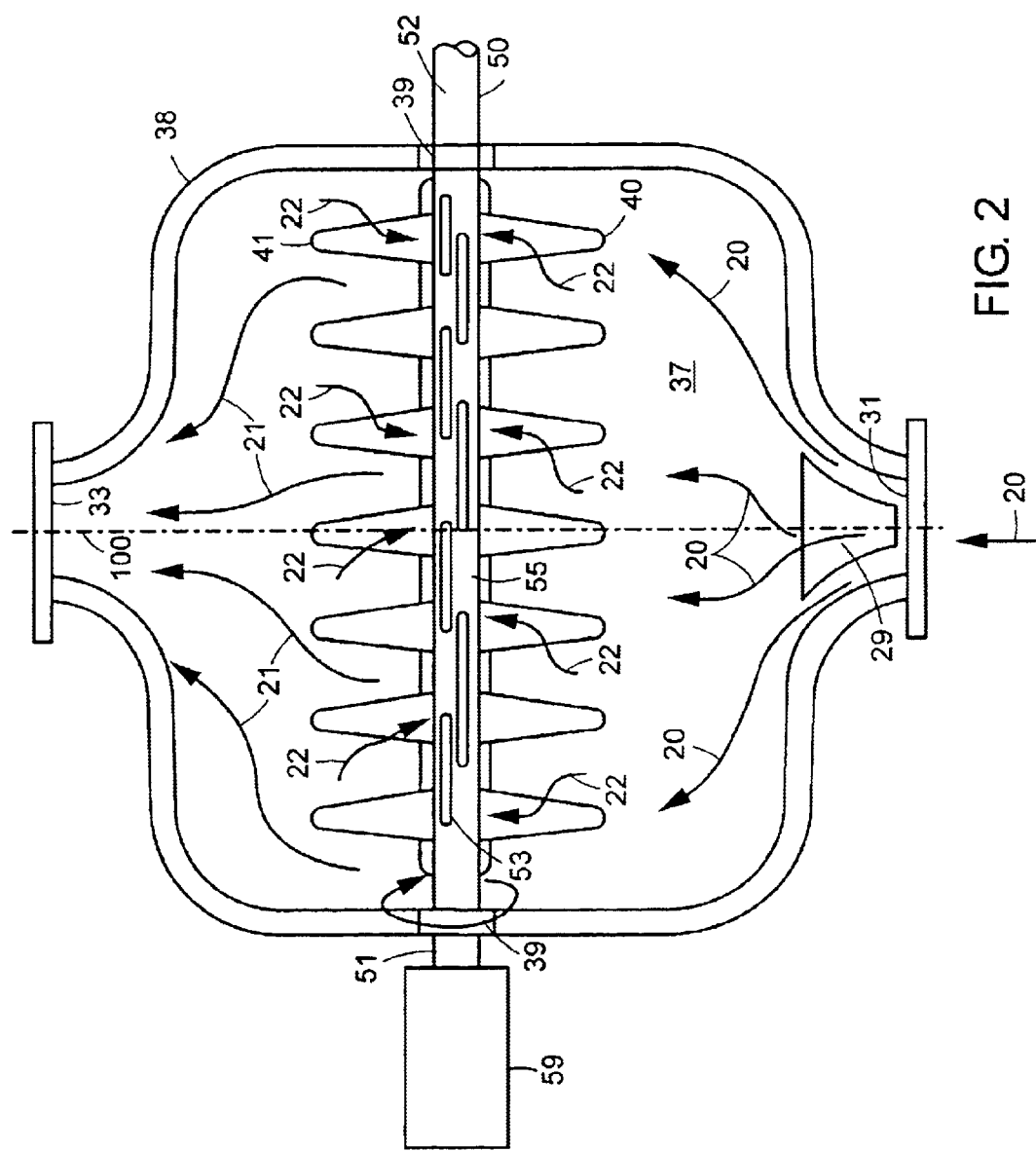
FIG. 2 is a view, partly in section, of a high shear rotating disc filter assembly.
Figure 3:
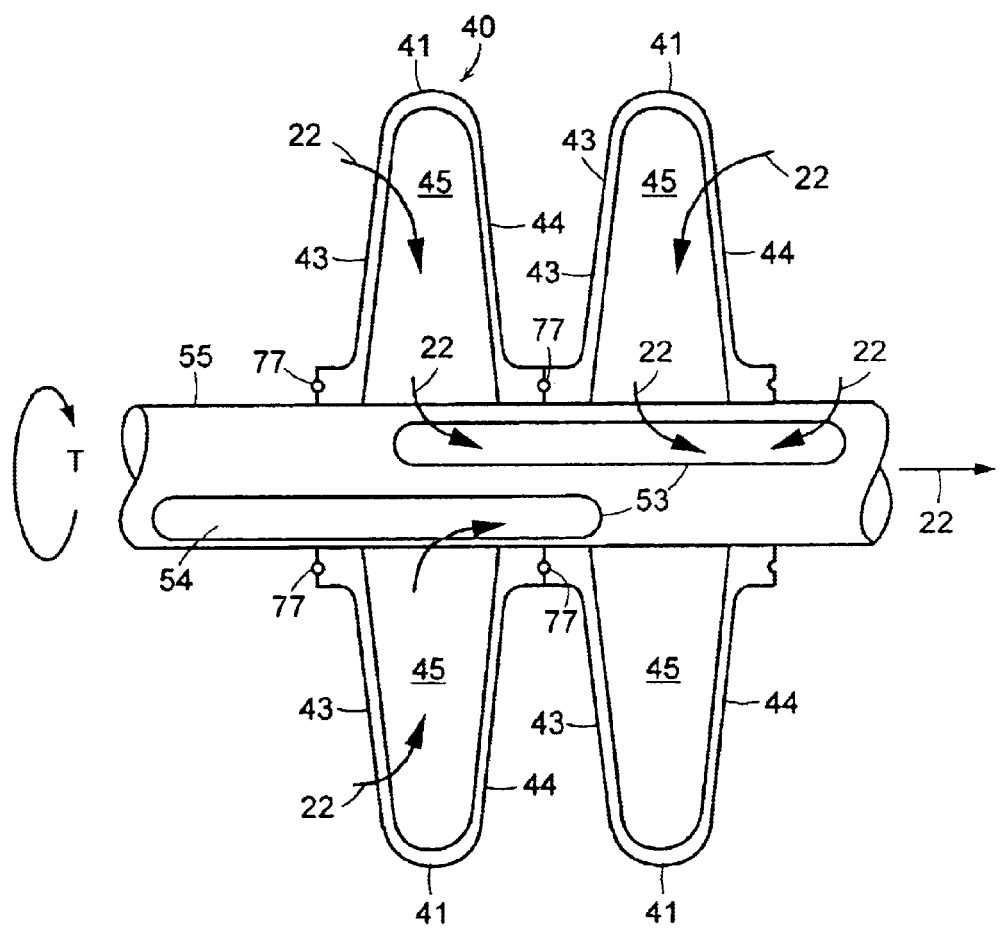
FIG. 3 is a close-up view, partly in section, of the high shear rotating filter discs.
Figure 4:
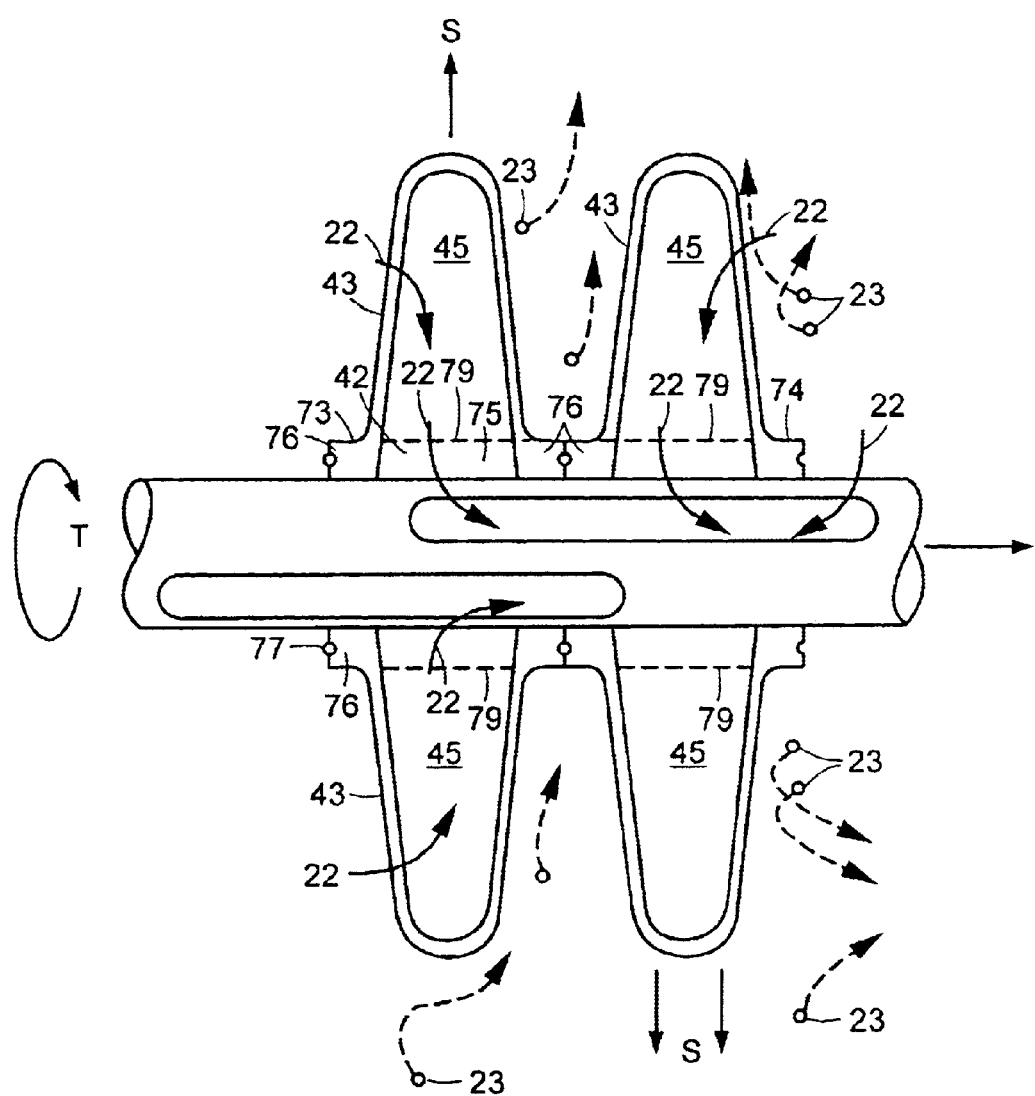
FIG. 4 illustrates the high shear rotating filter discs of FIG. 3 with particle paths.
Figure 5:
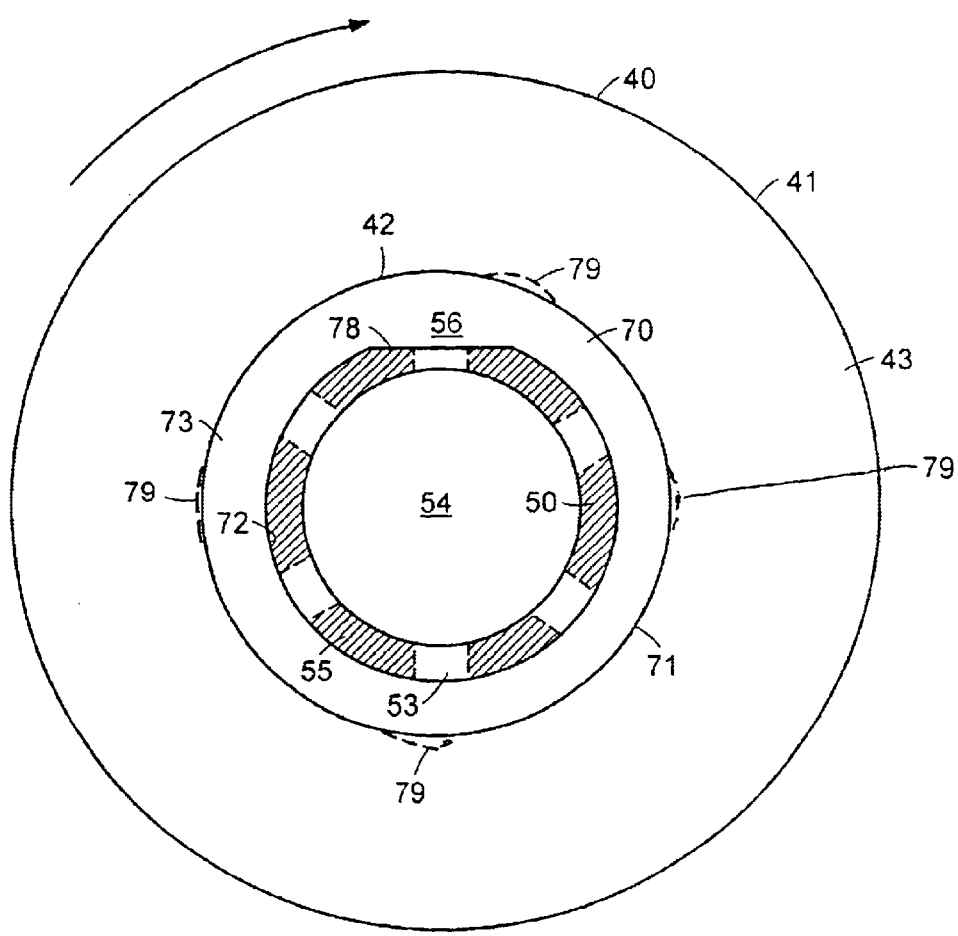
FIG. 5 is a side view of a high shear rotating filter disc.

The high shear rotating disc filter assembly 30 processes the slurry 20 and passes the filtrate 22, i.e., filtered liquid portion of the slurry 20, through a filtrate outlet 32 to a vacuum receiver 60. In this embodiment of the invention, the high shear rotating disc filter assembly 30 is generally enclosed within a vessel 38 having a top 34, a bottom 35, and a side wall 36 extending vertically upward from the bottom 35 to the top 34, said bottom 35, top 34 and interconnecting side wall 36 defining a high shear rotating disc filter assembly vessel interior 37. The slurry 20 is pumped from the feed tank 11 to the vessel inlet 31 located at the vessel bottom 35. Slurry is fed continuously so as to affect an overflow at the top 34 of the vessel 38. The vessel top 34 has a recycle outlet 33 which is piped back to the feed tank top recycle input means 14. As shown in FIG. 2, the vessel inlet 31 and recycle outlet 33 are coaxially aligned with a vessel vertical axis 100 that extends through a center of the vessel interior 37. The feed pump 26 continuously introduces slurry 20 to the high shear rotating disc filter assembly vessel 38 at a predetermined rate. The rate selected will not allow any settling of solids within the vessel 38, effectively coming in from the vessel bottom 35 and flushing through to the top 34 and out through the recycle outlet 33. The vessel side wall 36 has a filtrate outlet 32

The vacuum receiver 60 provides a collection point for the filtrate 22. The vacuum receiver 60 has an attached vacuum pump 61 to draw the filtrate out of the high shear rotating disc filter assembly filtrate outlet 32 into the receiver 60. The vacuum pump 61 provides negative pressure to affect liquid/solid separation in the high shear rotating disc filter assembly 30 as is described in more detail below. A filtrate pump 65 then draws the filtrate out of the vacuum receiver 60 to a desired receptacle (not shown). As will be shown in detail below, the high shear rotating disc filter assembly 30 is rotated by means of a disc assembly drive 59. "Slurry which has not been completely filtered" 21 is recycled out of the high shear rotating disc filter assembly 30 through the recycle outlet 33 back into the feed tank 11 through the feed tank's recycle input means 14.

Referring more particularly to FIGS. 2–5, there is shown in detail the high shear rotating disc filter assembly 30. The assembly 30 is comprised of one or more hollow filter discs 40 fitted onto an elongated shaft 50 having a first end 51 and a second end 52, said ends 51, 52 defining an elongated, longitudinal shaft axis. The filter discs 40 serve as the filtering medium and are generally constructed of a porous material such as sintered metal or ceramic with finely structured openings. In this embodiment of the invention, the elongated shaft 50 is positioned horizontally with respect to the vessel 38. Each disc 40 has a round outer perimeter 41, a central radial opening 42, a first surface 43 and an opposite second surface 44, said outer perimeter 41 defining a disc radial plane, said surfaces 43, 44, perimeter 41 and central opening 42 defining a disc interior 45. The disc radial plane is perpendicular to the longitudinal axis of the shaft 50. Each filter disc 40 may be flat or tapered with a greater separation between surfaces 43, 44 adjacent the central radial opening 42 than at the outer perimeter 41. Even a cylinder shape may be used. Each disc interior 45 also opens onto the central opening 42. The tapered shape has the advantage of offering a slightly larger filtering surface while promoting an easier path for dislodging solid particles that might tend to accumulate on the disc surfaces.

Each disc 40 may also be constructed as a metallic frame and fitted with soft filtering membranes for disc surfaces 43, 44 with appropriate support. In the case of a soft filtering membrane, the membranes would have to be properly secured with metallic strips in a wheel-spoke configuration so as to prevent the membrane surface from lifting and being spun out of position by the rotation of the disc. Soft membranes may not be suitable at higher rotational speeds due to the centrifugal forces being generated.

In this embodiment of the invention the shaft 50 is defined by a generally cylindrical wall 55 with a number of elongated slots 53 formed therein, each slot 53 opening into a shaft hollow interior 54, said elongated slots 53 having longitudinal axes parallel with the longitudinal axis of the shaft 50. The shaft first end 51 is attached to the disc assembly drive 59 which provides rotational torque "T" to the shaft 50. The shaft second end 52 is connected through the vacuum receiver 60 to a vacuum pump 61. Other invention embodiments may have the drive 59 and filtrate exit 52 on the same side.

Each filter disc 40 has a hollow, disc-shaped hub 70 with an outer perimeter 71 fitted to and within each disc central radial opening 42, said hub perimeter 71 having apertures 79 formed therein establishing an opening between the disc interior 45 and a hub interior 75. Each hub 70 has a central radial opening adapted to be fitted onto and about the shaft cylindrical wall 55. Each hub 70 has an impervious first surface 73 and an impervious second surface 74, said surfaces 73, 74, perimeter 71 and central opening 72 defining the hub hollow interior 75. Each hub 70 has a central neck 76 formed on each surface 73, 74 about the central opening 72, said necks 76 adapted to abut and fit against an adjacent hub neck.

The filter discs 40 with hub inserts 70 are stacked against each other onto the shaft 50. Each hub neck 76 abuts and fits against an adjacent hub neck. O-ring or elastomeric seals 77 are installed between hub necks 76 to insure liquid-tight junctions. The configuration between shaft 50 and discs 40, as described above, provides an opening from disc interiors 45 through the hub interiors 75, through the shaft wall slots 53 into the shaft interior 54. This provides a passage of filtrate 22 from the filter discs 40, through the hollow shaft 50, and out of the vessel 38, to the vacuum receiver 60 where the filtrate 22 is collected.

Because the shaft 50 provides the rotational force for the disc filters 40, the shaft wall 55 may incorporate an elongated flat surface strip 56 parallel to the longitudinal axis of the shaft 50. A corresponding flat portion 78 would be formed on the central radial opening 72 of each hub 70. This configuration provides a simple but effective method of securement for each filter disc 40 to the shaft 50 during a rotational mode.

The high shear rotating disc filter assembly 30 within the vessel 38 will consist of one or more filter disks 40 secured to the hollow shaft 50, as noted above, and interconnected in such a manner that the void within the discs 40 and shaft 50 will be under a constant vacuum as supplied by the external vacuum pump 61. Each vessel 38 may employ one or more high shear rotating disc filter assemblies 30, depending on the required filtration area necessitated by the overall volume being filtered.

The high shear rotating disc filter assembly 30 is housed inside a totally enclosed vessel 38 (see FIG. 2). The vessel 38 has the feed inlet connection 31 located at the vessel bottom 35 and a recycle outlet 33 connection at the vessel top 34. Special seals 39 are installed about the shaft wall 55 where the shaft 50 protrudes through the vessel side wall 36. The seals 39 permit rotation, but prevent leakage into and out of the vessel 38. All angled surfaces have sufficient radii to allow laminar, unhindered upward flow of the slurry 20. A diffuser plug 29 may be installed at the inlet 31 entry point of the vessel bottom 25 to evenly divide slurry 20 flow as it enters the vessel 38.

The high shear rotating disc filter assembly 30 within the vessel 38 rotates at a rotation which will sufficiently prevent build up of solids on the filtering surfaces 43, 44. The rotational motion is provided by an external drive 59 connected to the shaft first end 51. The rotation of the disc 40 about the shaft 50 creates a shearing action between the porous disc surfaces 43, 44 and the slurry 20, effectively preventing any build up of solids on the disc surfaces 43, 44. The shearing action "S" is caused by the outward radial centrifugal force caused by the spinning filter disc 40. Accordingly, with the shearing action, the solids 23 in the slurry 20 will be thrown away from or rejected by the filter disc surfaces 43, 44 and remain in suspension while the liquid portion of the slurry 20 is brought under vacuum through the porous disc surfaces 43, 44 into the disc interiors 45 as filtrate 22, said porous disc surfaces acting as the filtration medium. The filtrate 22 exits the assembly 30 into the receiver 60, while the solids 23 remain in suspension to be re-circulated back to the feed tank 11.

The recycled slurry 21 will eventually become heavier in solids content (as a percentage of the total) since part of liquid content of the total flow is being filtered out on a continuous basis. There will be a point at which the concentration of solids will be so high that the filtrate rate will slow down considerably. At this point, the solids-laden product will be discharged from the vessel for further processing or disposal. As dictated by the process requirements, the high shear rotating disc filter assembly 30 can then be internally washed or fresh slurry 20 can be introduced to start the process again.

The purpose of the present invention is the filtering of the liquid (as filtrate) and the concentration of the solids into separate streams. With continued use, there may be occasions when the pores on the disc surfaces 43, 44 may experience a build-up of particles. In such occurrences, the high shear rotating disc filter assembly 30 can be subjected to a reverse flow of pressurized air or liquid as a "blow-back" to dislodge these particles. A blow-back action would only be required for a brief period.

The present invention is particularly effective in liquid/solid separating applications where filters and filtering centrifuges are currently used, especially those consisting of soft solid particles. Applications can range from waste streams to pharmaceutical to food processing.

Another area of consideration is in applications where solid particulates are much lighter than the liquid. These solids are very difficult to filter and to separate under centrifugal forces and thereby require air-flotation technologies to assist in separation. Because of the constantly up-flowing stream of the present invention through the present invention high shear rotating disc filter assembly 30, it does not matter whether the solids or the liquid is the heavier phase. Thus the present invention can be successfully used in replacing air-flotation units.

Static clarifiers such as settling tanks, lamella clarifiers, sedimenting centrifuges, etc., can also be replaced with the present invention. These technologies essentially use "gravity" for affecting the liquid/solid separation. Individual components of a slurry have different specific gravities and will separate at varying rates. In the static units, the heavier solids will drop to the bottom of the tank while allowing the lighter liquid to decant from the lip of the vessel. The centrifuge will force solids to the perimeter of the unit while allowing the decant to overflow from the inner part of the vessel. In the present invention it does not matter which of the two components is the heavier material because the constantly moving slurry will carry the solids out of the vessel in a suspended state.

It is understood that the above-described embodiments are merely illustrative of the application. Other embodiments may be readily devised by those skilled in the art which will embody the principles of the invention and fall within the spirit and scope thereof. Different filter medium configurations may be used, such as continuous cylinders made of some porous material. The "shearing" principle of the rotating filter medium in an enclosed vessel with an upward flow of slurry are the key elements in the present invention. However, a disc configuration provides a superior shearing effect.

I claim:

1. A high shear rotating disc filter assembly in a filtering system for filtering a slurry comprised of liquid and very small particles, said filtering system having at least a feed tank with a slurry input means, a slurry output means, and a slurry recycle input means, a receiver tank, and a vacuum pump, comprising:

plurality of rotating discs constructed of a porous material, each said disc having a hollow interior, each said disk being mounted on an elongated cylindrical shaft, wherein each disc has a round outer perimeter, a central radial opening, a first surface and an opposite second surface, said outer perimeter defining a disc radial plane, said surfaces, perimeter and central opening defining a disc interior, each said disc having a radial plane perpendicular to a longitudinal axis of the shaft, each said disc interior opening onto the central opening, wherein each said disc has a hollow, disc-shaped hub insert with an outer perimeter fitted to and within each disc central radial opening, said hub perimeter having apertures formed therein establishing an opening between the disc interior and a hub interior, each hub having a central radial opening adapted to be fitted onto and about a shaft cylindrical wall, wherein each said hub insert has central neck formed on each surface about the central opening, said necks adapted to abut and fit against an adjacent hub neck;

a liquid-tight vessel enclosing said discs, said vessel being connected to said feed tank slurry output means for receiving said slurry, said feed tank having an output means connected to said feed tank slurry recycle input means, wherein said vessel has a top, a bottom, and a side wall extending vertically upward from the bottom to the top, said bottom, top and interconnecting side wall defining a vessel interior, a vessel vertical axis extending through a center of said vessel interior, wherein said slurry is pumped from the feed tank to a vessel inlet located at the vessel bottom, said slurry being fed continuously so as to affect an overflow at the top of the vessel, said vessel top having a recycle outlet which is piped back to the feed tank top slurry recycle input means, and wherein said vessel inlet and said recycle outlet are coaxially aligned with said vessel vertical axis;

said shaft having a hollow interior, said shaft having a first end and a second end, said ends defining an elongated, longitudinal shaft axis, said second end being connected to said vacuum pump and said receiver tank, said first end being connected to a rotational drive means, said shaft having a plurality of elongated slots opening into said shaft hollow interior and into said disc interiors, wherein the shaft first and second ends protrude through a shaft side wall, wherein said portion of said shaft holding said discs is positioned within the vessel so that the shaft longitudinal axis is perpendicular to the vessel vertical axis, wherein said shaft is further defined by a generally cylindrical wall with a plurality of elongated slots formed therein, each said slot opening into said shaft hollow interior, each said elongated slot having a longitudinal axis parallel with the longitudinal axis of the shaft;

wherein, said plurality of discs with hub inserts are stacked against each other onto said shaft, each hub neck abutting and fitting against an adjacent hub neck;

wherein, said vacuum pump is adapted to draw the slurry from the vessel bottom through said plurality of discs and through said shaft.

2. A high shear rotating disc filter assembly as recited in claim 1, further comprising:

an elastomeric seal installed between each abutting hub neck to insure liquid-tight junctions.

3. A high shear rotating disc filter assembly as recited in claim 2, further comprising:

said shaft cylindrical wall has an elongated flat surface strip parallel to the longitudinal axis of the shaft;

each hub insert central radial opening having a flat portion corresponding to said shaft elongated flat surface strip.

4. A high shear rotating disc filter assembly as recited in claim 3, further comprising:

a special seal installed about the shaft wall where the shaft protrudes through the vessel side wall.

5. A high shear rotating disc filter assembly as recited in claim 4, further comprising:

a diffuser plug may be installed at the inlet entry point of the vessel bottom, said diffuser plug adapted to evenly disperse slurry flow as slurry enters the vessel.

6. A high shear rotating disc filter assembly as recited in claim 5, wherein:

each filter disc is tapered with a greater separation between surfaces adjacent the central radial opening than at the outer perimeter.

7. A high shear rotating disc filter assembly as recited in claim 6, wherein:

said disc porous material is sintered metal.

8. A high shear rotating disc filter assembly as recited in claim 7, wherein:

said disc porous material is ceramic with finely structured openings.

* * * * *